INVENTOR
BO G. FREDRICSSON
BY
Mellin, Moore & Weissenberger
ATTORNEYS

INVENTOR.
BO G. FREDRICSSON
BY
Mellin, Moore & Weissenberger
ATTORNEYS

United States Patent Office 3,560,881

Patented Feb. 2, 1971

3,560,881

TRANSISTOR-KEYED CIRCUIT FOR TRANSIENT-FREE FREQUENCY SHIFT KEYING

Bo G. Fredricsson, San Francisco, Calif., assignor to Lynch Communication Systems, Inc., San Francisco, Calif., a corporation of Delaware Filed Nov. 18, 1968, Ser. No. 776,670
Int. Cl. H03b 3/00
U.S. Cl. 331—179 1 Claim

ABSTRACT OF THE DISCLOSURE

In frequency-shift keying a signal with a transistor keying device, phase shift at the instant of keying is avoided by connecting, in parallel with the oscillator tank circuit, a reactance in series with a parallel-connected resistor-and-unity-gain-amplifier combination so that energization of the unity gain amplifier prevents current flow through the resistor without physically disconnecting it from the circuit.

BACKGROUND OF THE INVENTION

This invention relates to so-called data sets, that is, interface devices which are interposed between a business machine and a telephone line to convert the binary data output of the business machine to frequency shift-keyed signals and vice versa. The device is also operative upon receipt of a ringing signal over the telephone line to actuate the business machine and to select the channels over which the frequency shift-keyed signals are transmitted.

A principal feature of the invention is the provision of a novel oscillator keying circuit which, in a simple and effective way, prevents the occurrence of transient disturbances due to phase shifts at the moment of keying when the oscillator frequency is changed as a result of keying.

Interface devices of the general type involved have been previously known, but they have been either unable to eliminate phase shift at keying (a necessity if data is to be handled at high speed) or have required complex and expensive circuitry to achieve that result. Also, the device described herein uses a method of isolating the ringing signal from the switching logic which has not been used in the prior art.

SUMMARY OF THE INVENTION

The device of this invention essentially consists of a ringing signal detector, a switching logic, and a bidirectional signal converter which is capable of selectively transmitting on a high frequency channel and receiving on a low frequency channel or vice versa. Simple isolation of the switching logic from the ringing signal is accomplished by the use of optical transducer means.

In accordance with a principal feature of the invention phase shift during frequency-shift keying of the transmitting oscillator is avoided by connecting, in parallel with the oscillator tank circuit, a reactance in series with a very low resistance. A unity gain amplifier is connected in parallel with the resistance, and the keying signal is used to energize this amplifier. Energization of the amplifier causes the signal current through the reactance to be drawn from the tank circuit, and the reactance is thus switched into and out of the tank circuit without changing its potential. This changes the resonant frequency of the tank circuit without introducing keying transients.

DESCRIPTION OF THE PREFERRED EMBODIMENT

Figure 1:
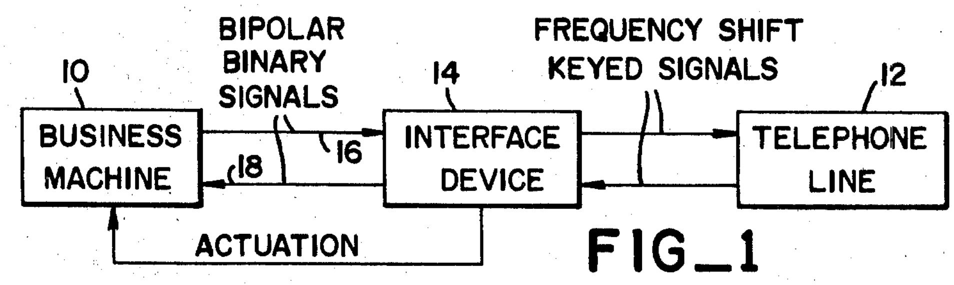
FIG. 1 is a block diagram of the principal components constituting a preferred environment of the invention.

FIG. 1 shows the preferred general environment of the invention. A business machine 10 is connected to a telephone line 12 through an interface device 14. The business machine 10 transmits data in the form of bipolar binary signals over line 16 and receives data in the form of bipolar binary signals over line 18. The interface device 14 converts the signals from line 16 into frequency shift-keyed signals lying in a first frequency channel and transmits them over the telephone line. Frequency shift-keyed signals lying in another frequency channel are received from the same telephone line 12 by the interface device 14 and are converted into bipolar binary signals suitable for transmission to the business machine over the line 18.

In addition, the interface device responds to the appearance of a ringing signal on the telephone line 12 by operating a switching logic which actuates the business machine and selects the frequency channels on which transmission and receipt of the frequency shift-keyed signals takes place. In this respect, it should be noted that the answering station always transmits in the high band and receives in the low band, whereas the originating station transmits in the low band and receives in the high band.

Figure 2:
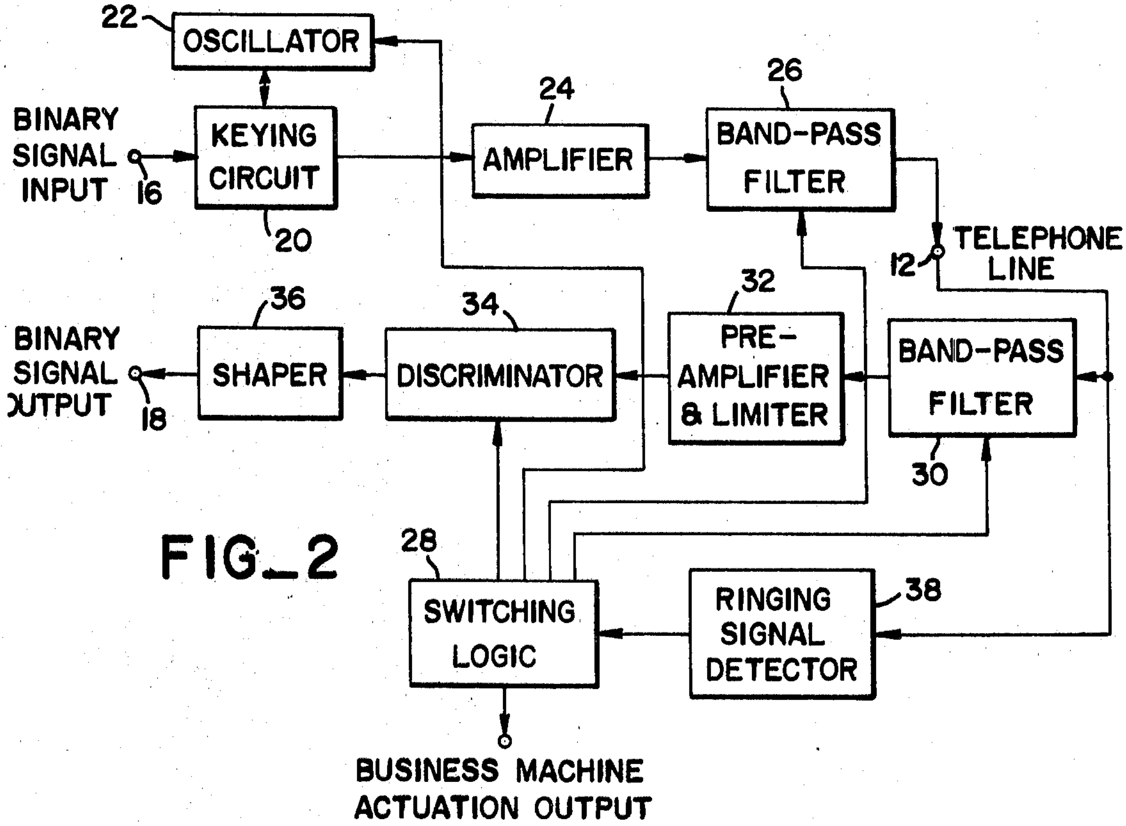
FIG. 2 is a block diagram showing the major components of the device of the invention.

Referring now to FIG. 2, it will be seen that the interface device 14 can conveniently be broken down into several subcomponents. The binary signal input from line 16 is fed into the keying signal input of the keying circuit 20. An oscillator 22 is keyed by the keying circuit 20 to selectively put out one of two predetermined frequencies governed by the polarity of the binary signal in line 16. The oscillator output is amplified in a buffer amplifier 24 and is fed into the telephone line 12 through a band-pass filter 26. The switching logic 28 switches the oscillator 22 and the band-pass filter 26 so as to cause the oscillator and filter to operate in either the high band or the low band, as the circumstances of any particular call require.

Incoming frequency shift-keyed signals are fed through a band-pass filter 30 and a pre-amplifier and limiter 32 to the discriminator 34. The discriminator 34 converts these signals to a bipolar D.C. signal which is then processed through a shaper 36 to produce bipolar binary signals of suitable quality for transmission to the business machine 10 over the lines 18.

The switching logic 28 is operated by a ringing signal detector 38 which responds to the appearance of a ringing signal on the telephone line by operating the switching logic to connect the business machine to the interface device 14 and to select the proper incoming and outgoing frequency bands for the particular call. The latter is accomplished by switching the oscillator 22, band-pass filters 26 and 30 and discriminator 34.

The ringing signal detector 38 may very simply consist of an optical transducer 40 including a lamp 42 and a light-sensitive resistor 44. The lamp is energized by receipt of a ringing signal of sufficient voltage and proper frequency as determined by resistor 46 and capacitor 48, and its light energizes the switching logic by varying the resistance of resistor 44. The use of the optical transducer 40 is a simple and effective way of isolating the switching logic from the telephone line, and it obviates the prior art necessity of providing relays which had to be equipped with thermistors and other circuitry to make them non-responsive to spurious signals.

Figure 3:
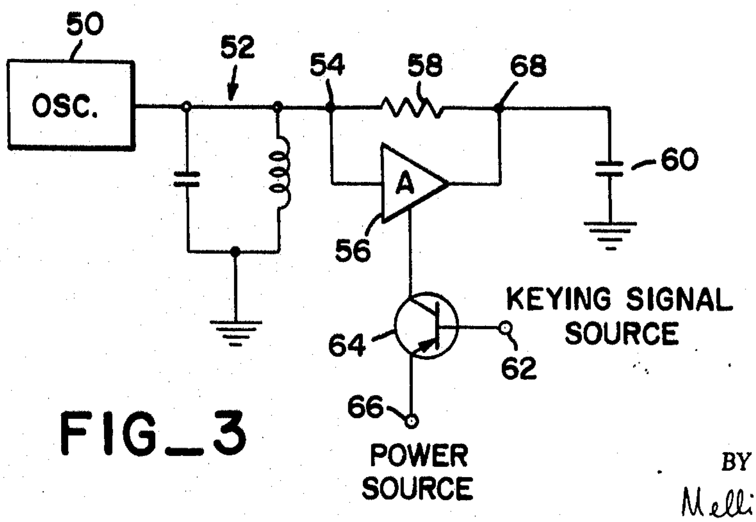
FIG. 3 is a diagram, partially in block form, showing the keying circuit of this invention.

FIG. 3 shows in partially schematic form the basic operation of a principal feature of this invention. In FIG. 3, the output frequency of an oscillator stage 50 is determined by the parameters of the tank circuit 52 and of the additional impedance seen by the tank circuit at point 54. In the absence of a keying signal, the unity gain amplifier 56 is deenergized, and the impedance seen by the tank circuit 52 is essentially the series impedance of resistor 58 and capacitor 60. The resistance of resistor 58 is sufficiently small, compared to the impedance of capacitor 60 at the frequencies involved, to make the total impedance of the resistor-capacitor combination 58, 60 essentially equal to the impedance of capacitor 60 alone.

The input impedance of the unity gain amplifier 56 is very high compared to the impedance of capacitor 60 at the frequencies involved. Consequently, the unity gain amplifier 56 appears to the tank circuit 52 essentially as an open circuit.

When the unity gain amplifier 56 is energized, it produces at junction 68 an output voltage equal to, and exactly in phase with, the input voltage at junction 54. Inasmuch as there is no potential difference between junctions 54 and 68 at any instant as long as the unity gain amplifier 56 is energized, no current can flow through resistor 58 during that time, and consequently the resistor 58 also appears as an open circuit to the tank circuit 52 as long as the unity gain amplifier 56 remains energized.

Inasmuch as the voltage at junction 68 remains essentially the same whether or not the amplifier 56 is energized, capacitor 60 draws a constant current at all times, either from the tank circuit 52 through resistor 58 when amplifier 56 is off, or from the power source 66 through amplifier 56 when it is on. With the current through capacitor 60 thus being constant and of constant phase, no keying transients can occur.

Figure 4:
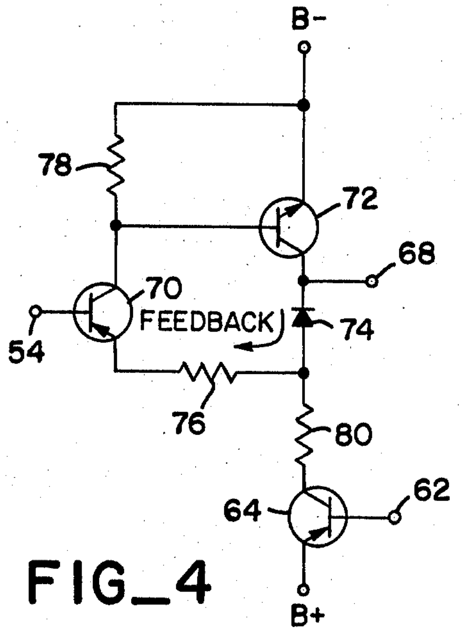
FIG. 4 is a circuit diagram of the keying circuit of FIG. 3.
Figure 5:
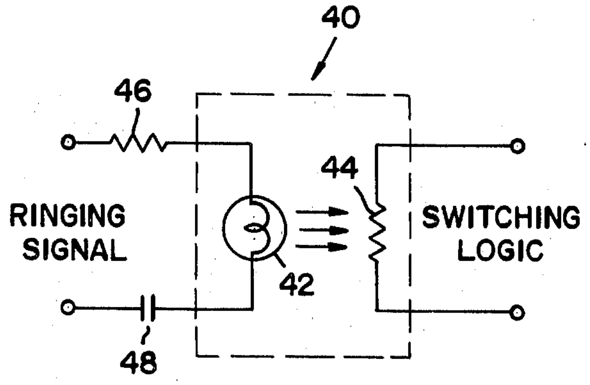
FIG. 5 is a circuit diagram of the optical transducer circuit.

The precise nature of the keying circuit including amplifier 56 and transistor 64 is shown in FIG. 4. In that figure, the switching transistor is again shown at 64, and the unity gain amplifier 56 is shown broken down into its component transistors 70 and 72. It will be seen that when the transistors 70 and 72 are energized, the voltage gain between points 54 and 68 is essentially unity because of the practically 100% feedback.

The 100% voltage feedback is accomplished as follows: Assuming that transistors 70 and 72 are normally conducting, an increase in the negative signal applied to input 54 will cause increased current flow in the emitter-collector circuit of n-p-n transistor 70. The resulting increased current flow through resistor 78 drives the base of p-n-p transistor 72 more positive. Consequently, the collector current of transistor 72 increases, more voltage drop develops across transistor 80, and output 68 goes more negative.

So far, the circuit is a simple two-stage amplifier, and in the absence of the feedback path through diode 74 and resistor 76, the voltage swing at output 68 would be in phase with, and much greater than, the voltage swing of the input signal. The connection of the output 68 back to the emitter of transistor 70, however, reduces the voltage gain of transistor 70 to the point where the voltage at output 68 must of necessity always be equal to the signal voltage at input 54 except for inherent drops in the feedback loop which are compensated by diode 74 and resistor 76.

The small resistor 76 compensates for the dynamic resistance of diode 74 which, by itself, would cause the gain between points 54 and 68 to be more than unity. A resistor 78 is provided as a turn-off resistor for transistor 72. The resistor 78 also compensates for the base leakage currents in transistors 70 and 72. The resistor 80 also functions as a D.C. current limiting resistor.

The purpose of the diode 74 is threefold. First, it minimizes the D.C. difference between points 54 and 68, which difference is the drop in transistor 70 minus the drop in diode 74. Secondly, it compensates for temperature-caused variations in the base-emitter voltage drop of transistor 70. Thirdly, it cooperates with transistor 70 to block any current flow between points 54 and 68 through the path including resistor 76 in either direction when the switching transistor 64 is cut off.

It will therefore be seen that the gist of the novel anti-phase shift circuit is the isolation, from an electrical point of view, of point 68 from point 54 while maintaining the potential at point 68 identical to that at point 54 at any given instant of time—i.e. the potential of point 68 swings in unison with the tank circuit oscillations at point 54. In other words, the potential at any point in the circuit is the same whether loaded or not.

As far as the gist of the specific structure is concerned, a significant aspect of the novelty lies in the fact that points 68 and 54 are permanently connected through the fixed impedance represented by resistor 58. To put it another way, points 68 and 54 are permanently connected by a fixed impedance path in parallel with a path containing an active element.

In the preferred embodiment, the active element is, of course, the unity gain amplifier 56 which is selectively energized and de-energized by the keying of its power source 66. Thus, keying does not affect the impedance of resistance path 58.

It follows that the anti-phase shift circuit of this invention is not limited in its use to the data set environment described in the present application. For that matter, the inventive arrangement is not limited to a tank circuit in the narrow sense, but is equally applicable to any network requiring electric isolation of a load from any circuit while maintaining the load at circuit potential.

Figure 6:
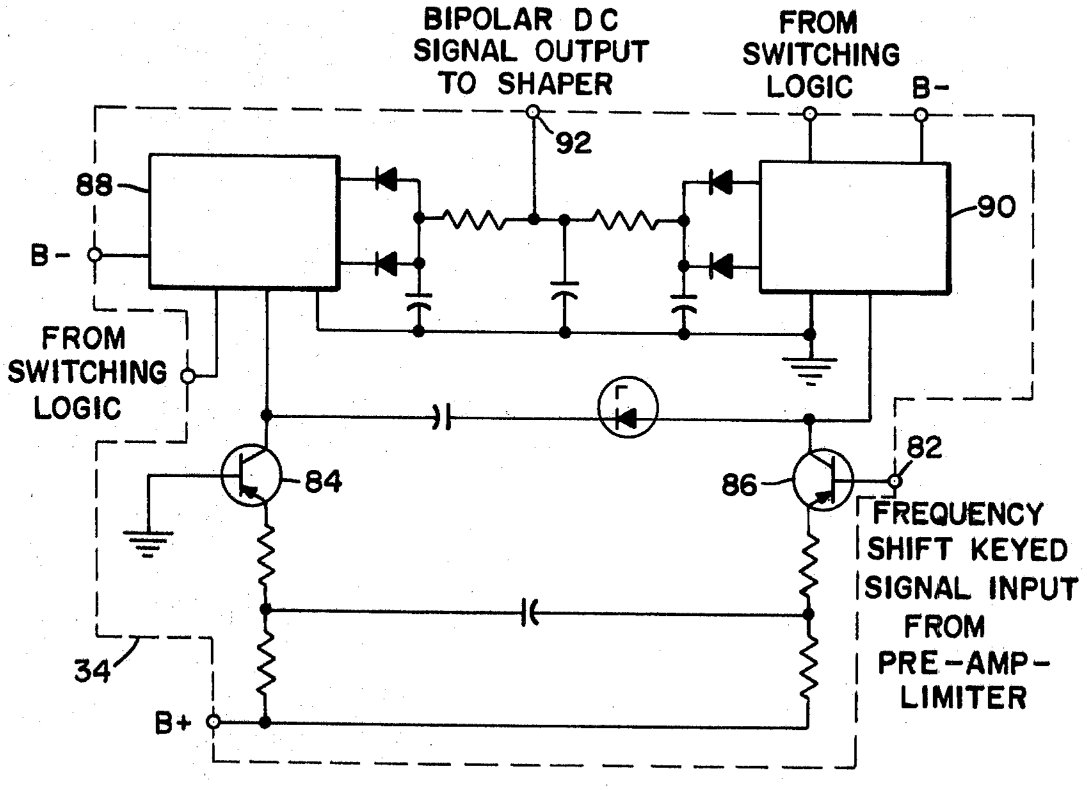
FIG. 6 is a circuit diagram of the discriminator.

Turning now to FIG. 6, it will be seen that the discriminator 34 consists of generally conventional signal conversion circuits. The incoming frequency shift-keyed signal is supplied to the discriminator from the preamplifier-limiter 32 at point 82. This signal is applied to a differential pair of transistors 84, 86 which operate the tuned circuits 88, 90, respectively. As will be readily seen from FIG. 6 the circuits 88, 90 produce a generally negative D.C. signal at output 92 when the signal at point 82 is of the frequency to which circuit 88 is tuned, and a generally positive D.C. signal when the frequency at point 82 is the one to which circuit 90 is tuned. The D.C. output at point 92 is then fed to the shaper 36.

It will be understood that tuned circuits 88 and 90 can be switched by the switching logic 28 to respond either to high channel or to low channel signals.

I claim:

1. A circuit for transient-free, transistor-keyed frequency shift keying, comprising:

(a) an oscillator having a tank circuit;

(b) a reactance connected in series with a resistor, said resistor-reactance combination being connected in parallel with said tank circuit;

(c) unity gain amplifier means having a high impedance input connected between said resistor and said tank circuit, and having its output connected between said resistor and said reactance; and (d) semiconductor means for keying said unity gain amplifier means on and off;

(e) whereby when said amplifier is keyed on, both ends of said resistor are always at the same potential and no current can flow through it, thus causing said reactance to be effectively disconnected from said tank circuit.

References Cited

UNITED STATES PATENTS

| | | | |
|---|---|---|---|
| 3,222,619 | 12/1965 | Hekimian | 325—30 |
| 3,317,753 | 5/1967 | Mayhew | 307—255 |

KATHLEEN H. CLAFFY, Primary Examiner

D. L. STEWART, Assistant Examiner

U.S. Cl. X.R.

178—66; 325—30, 163; 332—16, 30